United States Patent

Southcott

[11] Patent Number: 5,896,775
[45] Date of Patent: Apr. 27, 1999

[54] GEAR ARRANGEMENT

[75] Inventor: Brian Southcott, Clarence Gardens, Australia

[73] Assignee: Adelaide Gear Pty Ltd, Clarence Gardens, Australia

[21] Appl. No.: 08/758,900

[22] Filed: Dec. 2, 1996

[51] Int. Cl.[6] .............................. F16H 57/00; F16H 48/06
[52] U.S. Cl. ..................... 74/410; 74/DIG. 10; 475/230
[58] Field of Search .............. 74/DIG. 10, 412, 74/413, 410; 475/220, 230

[56] References Cited

U.S. PATENT DOCUMENTS

| | | | |
|---|---|---|---|
| 1,440,555 | 1/1923 | Ross | 475/230 |
| 2,895,342 | 7/1959 | Hayhurst | 74/410 |
| 2,920,497 | 1/1960 | Wiken | 74/410 |
| 3,081,648 | 3/1963 | Duer | 74/801 |
| 3,381,509 | 5/1968 | Gay | 74/410 |
| 3,926,064 | 12/1975 | Durand . | |
| 4,399,719 | 8/1983 | Chszanieki et al. | 74/410 |
| 4,858,487 | 8/1989 | Mercier . | |
| 5,098,358 | 3/1992 | Igaku | 74/DIG. 10 X |
| 5,242,336 | 9/1993 | Hori | 475/220 X |

FOREIGN PATENT DOCUMENTS

| | | |
|---|---|---|
| B-77980/87 | 3/1988 | Australia . |
| 2245228 | 5/1975 | France . |
| 2602103 | 7/1977 | Germany . |

*Primary Examiner*—Rodney H. Bonck
*Assistant Examiner*—Marcus Charles
*Attorney, Agent, or Firm*—Watts, Hoffmann, Fisher & Heinke Co., L.P.A.

[57] ABSTRACT

A gear arrangement for a high reduction of the input rotational velocities is achieved in a single reduction gear train, utilises a long narrow driving pinion (12) located between two idler pinions (13) to mesh with the teeth of both, and the teeth of both idler pinions (13) mesh with teeth (14) of a year wheel, thereby sharing the load of the idler pinions (13), which can be of nylon for providing a quiet gear train.

7 Claims, 1 Drawing Sheet

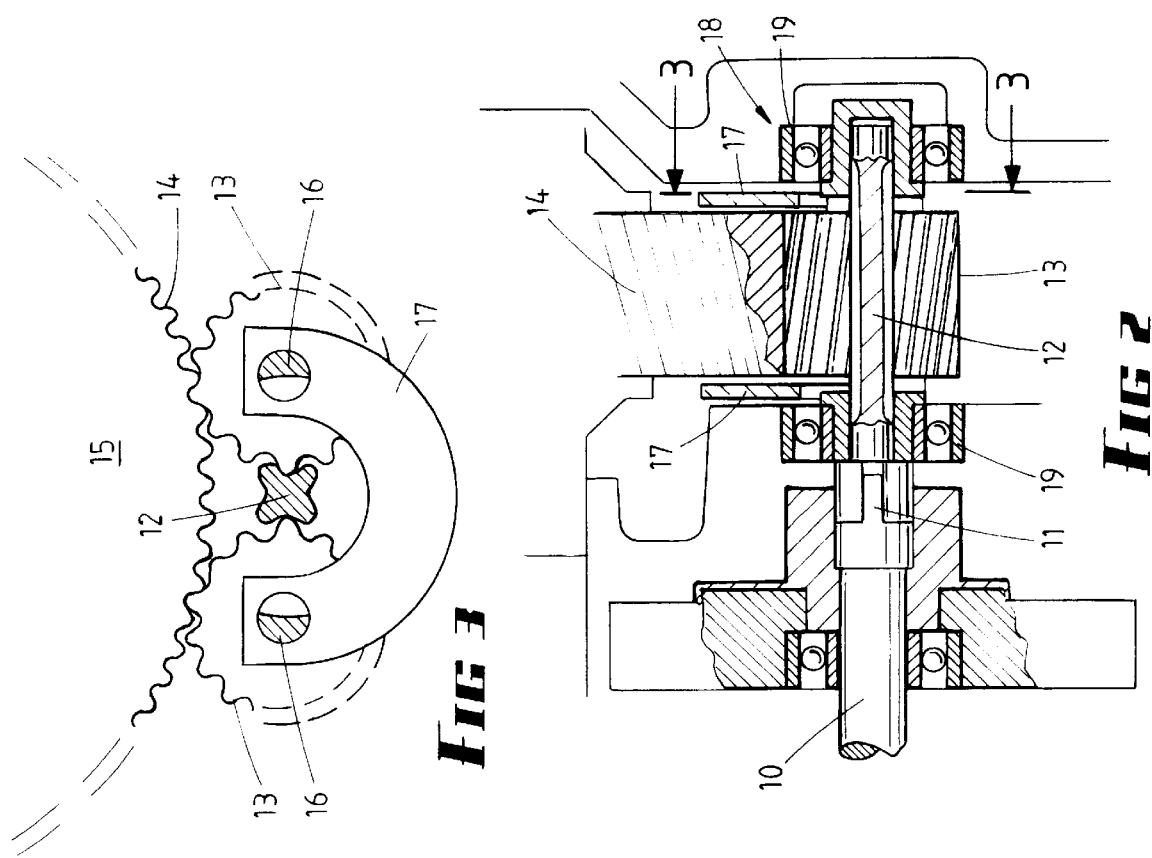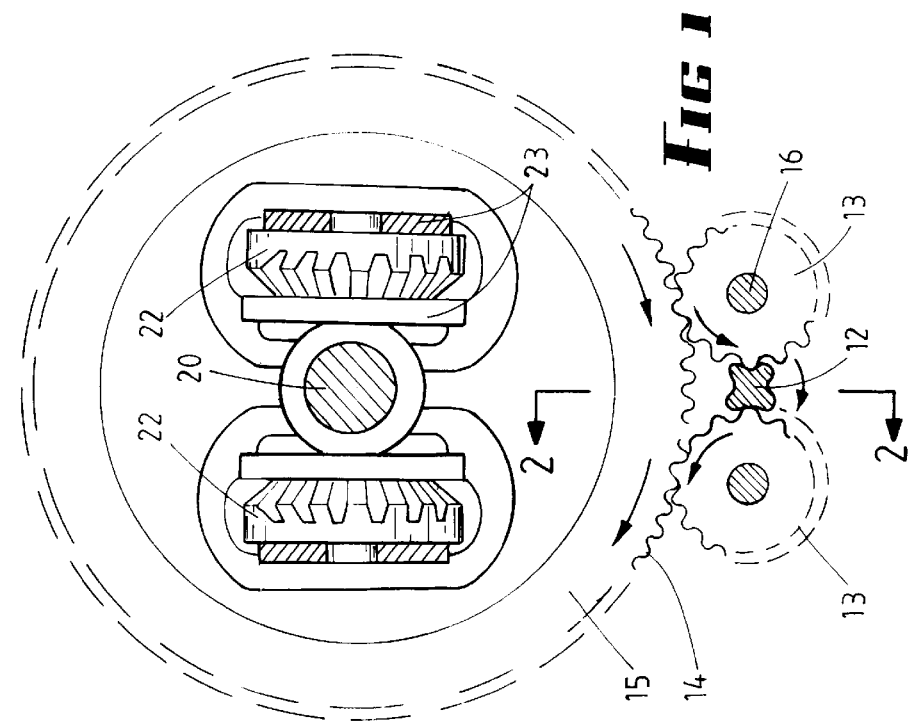

GEAR ARRANGEMENT

This invention relates to an improved gear arrangement for the transmission of power through a large reduction.

There are applications in a number of machines, and particularly in power driven scooters and wheelchairs, for a relatively high speed electric motor to drive wheels at a relatively low speed The gear reduction required is so great that at least two stages are frequently used, and consequently there is a considerable expense entailed in the gearing. Bearing loads are high, tooth meshing speeds are high, and noise and wear are consequential problems. This expense can be largely reduced, and the noise can also be reduced the gearing is of a resilient plastics material such as nylon instead of metal, but one of the difficulties encountered with the use of nylon gears is that the tooth strength is sometimes insufficient to provide the required high factor of safety, and even with helical teeth the noise exceeds acceptable levels.

PRIOR ART

Load sharing of drive in gear boxes is already known.

(a) A search through patent records classes F16H and B60K revealed German Patent Application DE 2602103 (1977) (Thyssen) which disclosed a double helical pinion meshing with two gears to provide equal distribution of load.

U.S. Pat. No. 4,858,487 (1988) (Renault) disclosed two start helical gears.

U.S. Pat. No. 3,926,064 (1975) (Durand) disclosed two second stage and four fourth stage pinions.

U.S. Pat. No. 4,751,853 (1988) (Dyneer) disclosed two spined spindles each forming an axle for driving pinions meshing with internal pinions.

(b) It is known that a pinion having very few teeth on an extension of a motor shaft has directly engaged teeth on a driven gear which formed an outer component of a universal drive for a motor driven wheelchair, but in a configuration wherein there was no load sharing.

No prior art is known to the Applicant wherein a small diameter pinion meshes on opposite sides with a pair of idler pinions, each of which meshes with teeth of a driven gear.

The main object of this invention is to provide a reduction gearing which avoids the need for two stages of reduction, which is of relatively low cost, and wherein the effective tooth load is shared in a balanced arrangement in which there is little or no bending moment imparted to the pinion

BRIEF SUMMARY OF THE INVENTION

In the invention, opposite sides of a single driving pinion engage the teeth of two intermediate idler pinions which in turn both engage peripheral teeth of a gear wheel to drive a driven shaft which may, for example, be coupled to the wheels of a wheelchair, desirably through a differential gear arrangement.

BRIEF DESCRIPTION OF THE PREFERRED EMBODIMENT

An embodiment of the invention is described hereunder with respect to and is illustrated in the accompanying drawings wherein FIG. 1 is a end view showing the motor driven pinion, the intermediate idler pinions and the driven gear;

FIG. 2 is a diagrammatic fragmentary part-section taken on plane 2—2 of FIG. 1; and FIG. 3 is a fragmentary section taken on plane 3—3 of FIG. 2, drawn to a larger scale.

In this embodiment, motor shaft 10 couples through a coupling key 11 into a motor driven metal driving pinion 12, as illustrated, the driving pinion 12 having four only teeth but the teeth are helical, and also elongate as shown in FIG. 2. In some embodiments fewer than four teeth may be used on pinion 12, but the invention is limited to a driving pinion having no more than ten teeth (to limit the size of the driven gear).

Teeth on opposite sides of pinion 12 engage the teeth of two spaced intermediate idler pinions 13, which in this embodiment are of nylon or other suitable plastics material for driving purposes, and the teeth of both the pinions 13 engage the teeth 14 of a driven gear wheel 15 as shown in FIG. 3. They are mechanically synchronised and the teeth 14 are of metal, but in some applications can also be of plastics material for noise level control. The use of nylon in idler pinions 13 imparts the advantage that any minor variation in dimension of the teeth can be accommodated by the resilience of the teeth. This way, a very high degree of equality of load sharing of the teeth is achieved, in turn reducing the probability of fracture to almost half what occurs with prior art gear trains. Furthermore, the engagement of opposite sides of pinion 12 with the idler pinions 13 is in the same plane, so that little or no bending moment is imparted to the small pinion 12. (In prior art gearboxes of this type, pinion flexure is a serious problem.)

FIG. 3 illustrates the mounting arrangement for the idler pinions 13. Each pinion 13 is freely rotational on a respective support shaft 16, both ends of each shaft being supported by "C" plates 17. Projecting ends of the support shafts 16 are halved diametrically to a generally semi-circular shape as illustrated, and enter corresponding half circular apertures in the frame at 18 where the frame supports shaft bearings 19, this arrangement locking the shafts 16 against rotation. Axes of rotation of pinions 12 and 13 are co-planar, further avoiding possibility of bending moment occurring in pinion 12.

The gear wheel 15 transmits the torque to a pair of co-axially aligned output shafts 20 which can be coupled to the wheels of a scooter through the differential gearing arrangement shown, by which the torque is at least partially transmitted also to each wheel of the scooter. One convenient arrangement illustrated in FIG. 1 is for the torque transmitting pinions 22 of the differential gearing to be carried in the gear wheel 15, and this is achieved conveniently by having slots in the gear wheel 15 which receive bearing plates 23 which themselves carry the pinions 22. (The outer of the bearing plates 23 are both shown in section.) This latter arrangement is well known and forms no part of this invention.

A consideration of the above embodiment will indicate the invention to be very simple, but there is no need for separate bearings for idler pinions 13 because of the short chordal distance between the teeth of pinions 12 and 13, pinions 13 in being nylon running directly on their shafts. Furthermore, bending moments otherwise imparted to pinion 12 are avoided, since as said the driving pinion 12 and idler pinions 13 have coplanar axes of rotation. Still further, the surface meshing speeds are low, and in consequence both the volume of noise and its frequency are low. However, most of these advantages are achieved in this invention even if the axes of the driving and intermediate idler pinions are not coplanar. In all instances, the invention will be seen to achieve an inexpensive, quiet-running mechanically strong gear train, particularly suitable for various applications where a large degree of speed reduction is required associated with a strong but silent gear train.

We claim:

1. A gear arrangement comprising an elongate driving pinion having no more than 10 teeth, two intermediate idler pinions, and a toothed driven wheel, said driving pinion being located between said idler pinions with teeth on opposite sides of the driving pinion engaging teeth of said idler pinions, and the teeth of both of said idler pinions engaging the teeth of said driven wheel, the axes of rotation of the driving pinion and the idler pinions being coplanar, and further comprising bearings supporting the driving pinion at spaced locations straddling the driving pinion engagements with the idler pinions, the driving and idler pinions being journaled independently of each other to maintain the coplanar relationship whereby the load transmitted by the idler pinions to the driven wheel is equally shared between the said idler pinions.

2. A gear arrangement according to claim 1 wherein said idler pinions each comprise teeth of resilient polymeric material.

3. A gear arrangement according to claim 2 wherein teeth of said idle pinions are nylon.

4. A gear arrangement according to claim 2 wherein said driving pinion is of metal.

5. A gear arrangement according to claim 2 wherein said gear wheel is of metal and comprises a pair of power transmitting bevel gears in a configuration which, in use, is a differential gear box.

6. The gear arrangement of claim 1, wherein the idler gears are of resilient polymeric material rotatively mounted on fixed shafts.

7. The gear arrangement of claim 1, wherein the idler gears are rotatively mounted on fixed shafts.

* * * * *